United States Patent
Demetrio

[11] Patent Number: 5,803,307
[45] Date of Patent: Sep. 8, 1998

[54] NESTABLE COOKING UTENSIL WITH AN ARTICULABLE HANDLE

[76] Inventor: Bruno Demetrio, P.O. Box 2988, Southampton, N.Y. 11969

[21] Appl. No.: 833,839

[22] Filed: Apr. 10, 1997

Related U.S. Application Data

[62] Division of Ser. No. 571,078, Dec. 12, 1995, Pat. No. 5,660,300.

[51] Int. Cl.$^6$ ................................................ B65D 25/28
[52] U.S. Cl. ...................... 220/763; 220/756; 220/764; 220/4.21; 16/114 A
[58] Field of Search ................................... 220/756, 757, 220/759, 762, 763, 764, 769, 912, 23.83, 23.86, 4.21, 212.5, 731; 16/100 A, 114 A

[56] References Cited

U.S. PATENT DOCUMENTS

| | | |
|---|---|---|
| 310,365 | 1/1885 | Bock . |
| 454,759 | 6/1891 | Oden . |
| 883,652 | 3/1908 | Lenschow et al. . |
| 1,732,003 | 10/1929 | Drumm . |
| 1,745,592 | 2/1930 | White . |
| 1,874,807 | 8/1932 | Rudolph . |
| 2,177,487 | 10/1939 | Howlett ........................................ 53/8 |
| 2,403,191 | 7/1946 | Phillips ..................................... 220/94 |
| 2,454,054 | 11/1948 | Gibb ........................................ 99/449 |
| 2,494,159 | 1/1950 | Bernstein ................................. 16/114 |
| 2,712,151 | 7/1955 | Becht ....................................... 16/114 |
| 2,722,173 | 11/1955 | Cunningham ............................. 99/428 |
| 2,841,814 | 7/1958 | Murphy ..................................... 16/110 |
| 3,007,595 | 11/1961 | Remley ........................................ 220/4 |
| 3,306,648 | 2/1967 | Serio ......................................... 294/16 |
| 4,196,821 | 4/1980 | Teti, Jr. et al. .......................... 220/94 |
| 4,895,269 | 1/1990 | Cade ......................................... 220/90 |

FOREIGN PATENT DOCUMENTS

| | | |
|---|---|---|
| 2697425 | 5/1994 | France .................................... 220/912 |
| 1 013 990 | 8/1957 | Germany . |
| 348238 | 5/1931 | United Kingdom . |
| 881176 | 11/1961 | United Kingdom . |
| 936959 | 9/1963 | United Kingdom . |

*Primary Examiner*—Stephen J. Castellano
*Attorney, Agent, or Firm*—Cohen, Pontani, Lieberman & Pavane

[57] ABSTRACT

This invention relates to a frying pan with an articulable handle which can be mated with a second frying pan with a fixed handle to flip foods without the intermediate transfer of the food from the frying pan to another frying pan or dish. When cooking an omelette or other similar food in currently available frying pans, utensils are usually necessary to turn the food over within the frying pan. Quite often, the utensils damage the food when turned over in this manner and affect the final presentation of the food. The present invention addresses this shortcoming by providing a pair of nestable frying pans, one pan having an articulable handle, that permit a cook to flip food within the pans without the need for additional flipping utensils thereby eliminating possible food damage.

24 Claims, 4 Drawing Sheets

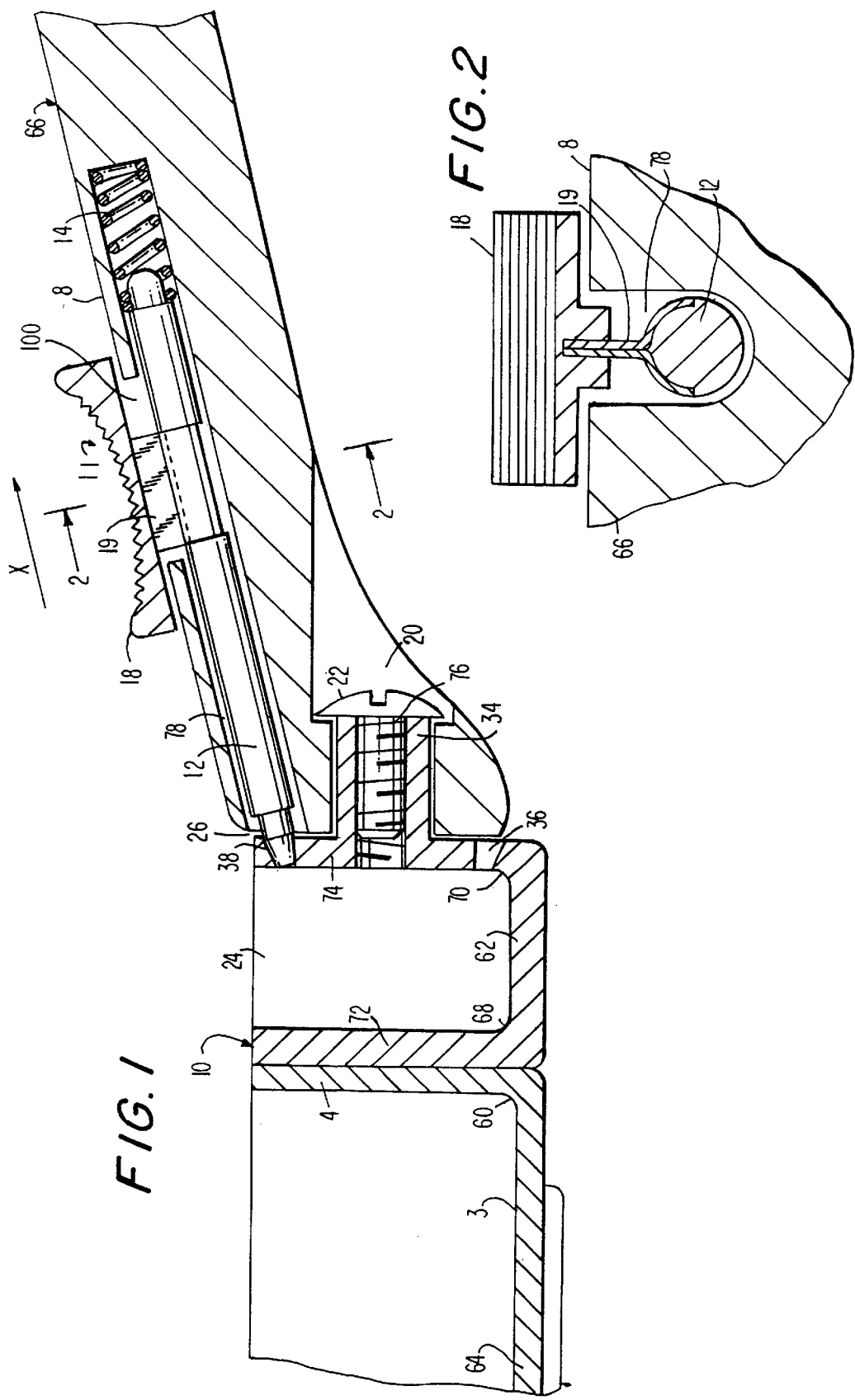

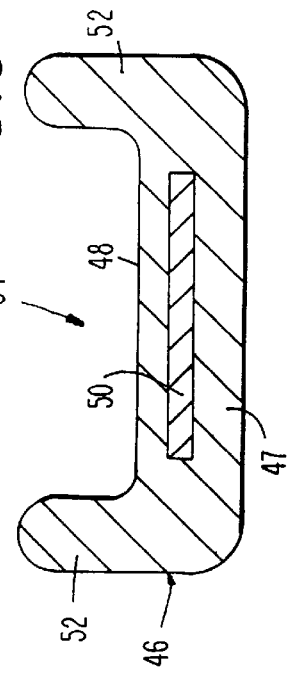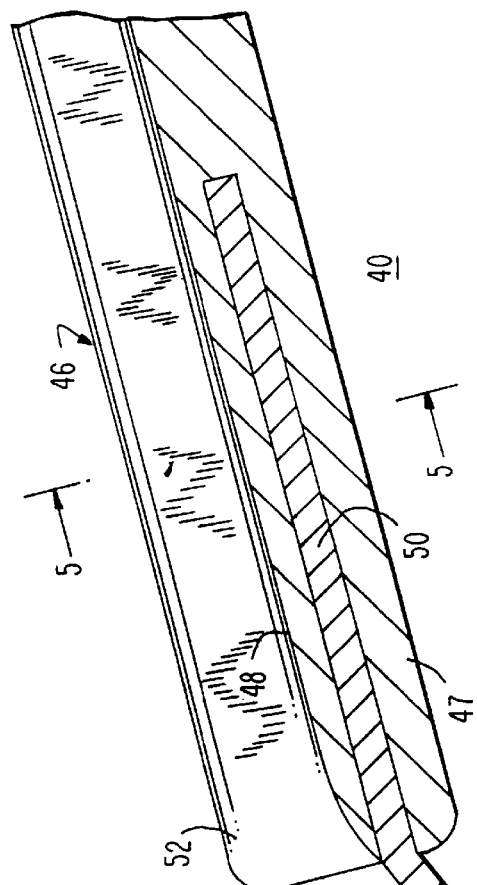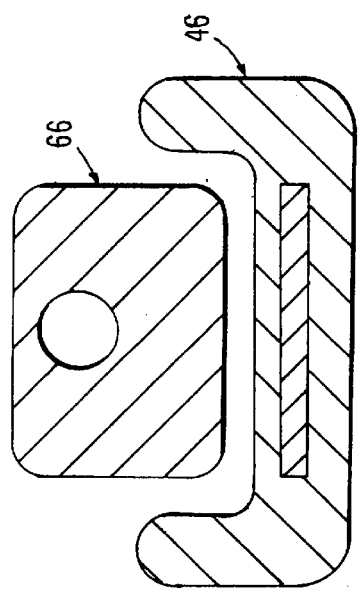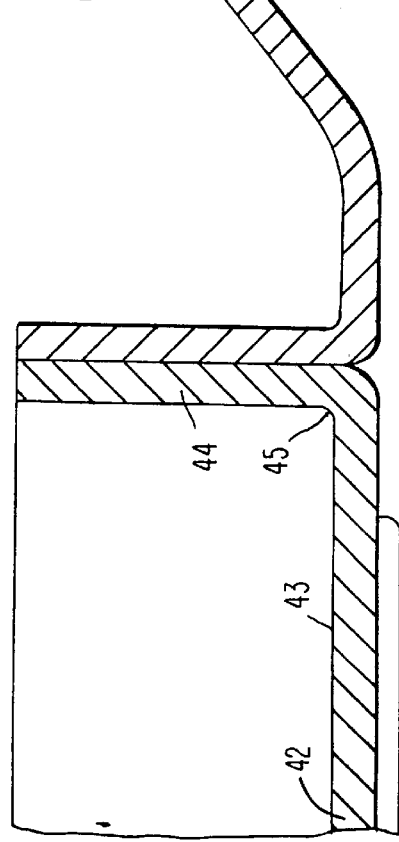

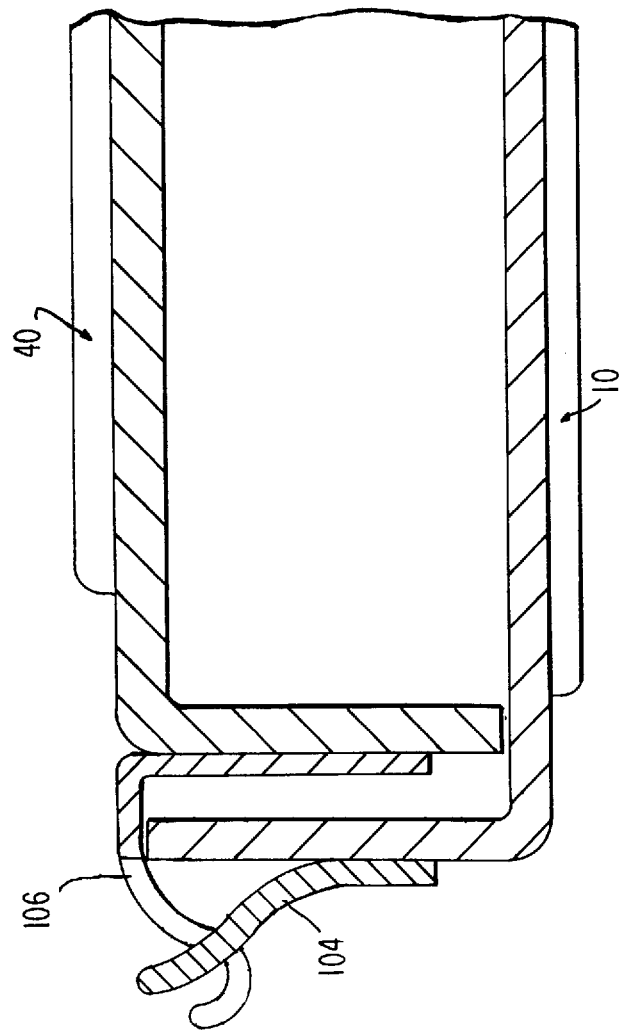

NESTABLE COOKING UTENSIL WITH AN ARTICULABLE HANDLE

This is a division of application Ser. No. 08/571,078, filed Dec. 12, 1995 now U.S. Pat. No. 5,660,300.

BACKGROUND OF THE INVENTION

1. Field of Invention

This invention relates to a cooking utensil, and more particularly, to a frying pan with an articulable handle which can be mated with a second frying pan with a fixed handle to flip foods without the intermediate transfer of the food from the frying pan to another frying pan or dish.

2. Description of the Related Art

When cooking an omelette or other similar food in currently available frying pans, utensils are usually necessary to turn the food over within the frying pan. Quite often, the utensils damage the food when turned over in this manner and affect the final presentation of the food. The present invention addresses this shortcoming by providing a pair of nestable frying pans, one pan having an articulable handle, that permit a cook to flip food within the pans without the need for additional flipping utensils thereby eliminating possible food damage.

The prior art teaches numerous cooking pan configurations for invertably placing one pan of a pair of frying pans on top of the other. U.S. Pat. No. 3,007,595 to Remley describes a pair of hingeably matable frying pans which can be joined via a mating hinge best seen in FIG. 6 of Remley. The two frying pans facilitate the multi-sided cooking of articles placed therein, and the frying pans may be segmented into various cooking portions. However, the Remley reference does not teach or suggest the mating of a pair of handles, one of such handles being rotatable so as to maintain the correct angular relation of the handle to the frying pan in either the original or inverted positions. U.S. Pat. No. 2,722,173 to Cunningham discloses a matable pair of frying pans but discloses no rotationally movable or matable handle arrangement. Likewise, U.S. Pat. Nos. 2,177,487 and 310,365 to Howlett and Bock, respectively, also fail to disclose the novel rotatable and matable handle arrangement such as that used in the present invention.

These known constructions provide fixed handle frying pan pairs usable either together, i.e. one pan nested atop the other, or as separate frying pans. The handles are fixedly mounted to the frying pan in a substantially perpendicular orientation to the side wall of the frying pan and may form a single graspable handle when the pans are used together. In addition, nestable frying pans articulable about a fixed handle, e.g. commercial-type waffle irons are also known. Here too, however, the handle is fixedly mounted in a substantially perpendicular orientation with respect to the side wall of the pan. None of the known cooking apparatus combine nestable frying pans where one pan has an articulable handle which combines with a fixed handle on the other pan to form a single grippable handle used to rotate nested cooking pans while maintaining the upward orientation of the frying pan handle.

SUMMARY OF THE INVENTION

The present invention provides a cooking utensil comprising a pair of frying pans which can be used either as separate cooking utensils or in combination as a single cooking utensil. When used separately, each frying pan functions in much the same manner as a typical frying pan with the exception that one of the frying pans has an articulable handle. When used in combination, the frying pans provide a cooking utensil capable of flipping food within the frying pan without the need for other utensils or for removing the food from the pan as an intermediate step. This is particularly useful when preparing omelettes and the like. The frying pans can be nested, one inverted and placed on top of the other, such that the cooking surfaces of the pans are in a confronting or opposed relationship. When used in this manner, the handles form a single grippable handle allowing the user to simultaneously turn over both pans, thus flipping the food within the pans.

The present invention comprises a first frying pan having an articulable handle which is movable between first and second handle positions. When in the first handle position, the upper surface of the articulable handle is oriented generally upward relative to the side wall of the first frying pan. When in the second handle position, the articulable handle is out of the first handle position. The first pan also has a trough around its side wall, the trough being generally U-shaped in cross-section and suited for accepting the outer edge of the second frying pan when the second pan is inverted and placed on top of the first pan. The invention further comprises a second frying pan having a fixed handle having an upper surface oriented generally upward relative to a side wall of the second frying pan. Side walls integrally formed with the upper surface extend in a generally upward direction therefrom and form a ridge on the fixed handle.

If desired, a hinge pair may be used when the frying pans are used together. The hinge pair, a complimentary part of which is located on each frying pan, may secure the two pans together for flipping.

In use, the articulable handle of the first frying pan is rotated from the first handle position to the second handle position. The second pan is inverted and placed over the first pan such that the side wall of the second pan rests within the trough of the first pan. When placed together in this manner, the articulable handle and fixed handle are closely parallel and form a single grippable handle which is used to simultaneously turn over the two frying pans. After flipping the two pans over, the first pan, which is now above and in a covering relation with the second pan, can be removed from the second pan and the cooking finished in the second frying pan. The articulable handle of the first frying pan may be returned to the first handle position and the first frying pan is ready for further cooking.

The various features of novelty which characterize the invention are pointed out with particularity in the claims annexed to and forming a part of this disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings in which like numerals are used to denote similar elements:

FIG. 1 is a fragmentary sectional view of a frying pan with an articulable handle according to the present invention;

FIG. 2 is a cross-sectional taken along the line 2—2 in FIG. 1;

FIG. 3 is a fragmentary sectional view of a frying pan with a fixed handle according to the present invention;

FIG. 5 is a cross-sectional view taken along the line 5—5 in FIG. 3;

FIG. 6 is a cross-sectional view taken along the line 6—6 in FIG. 4;

FIG. 7 is a fragmentary sectional view of the frying pan of FIG. 3 shown inverted and on top of the frying pan of FIG. 1 showing a hinging means.

DETAILED DESCRIPTION OF THE PREFERRED EMBODIMENTS

Figure 4:
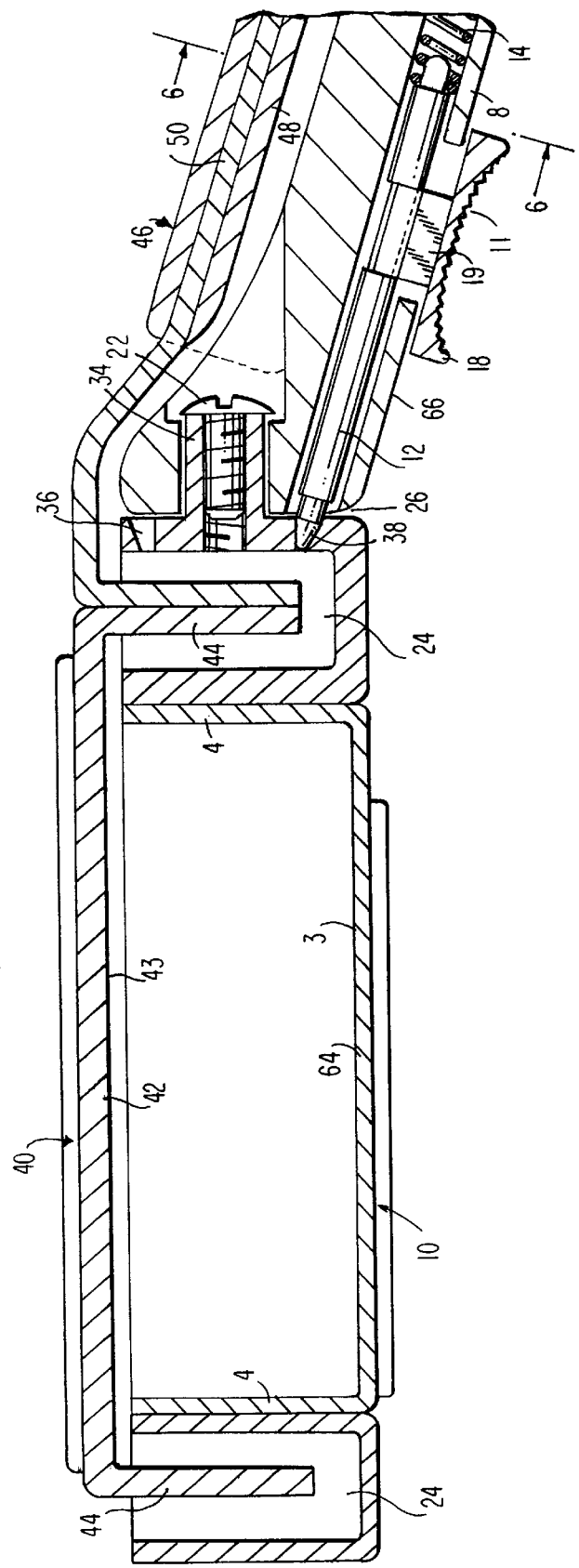
FIG. 4 is a fragmentary sectional view of the frying pan of FIG. 3 shown inverted and on top of the frying pan of FIG. 1.

Referring now to the drawings in detail and initially to FIG. 1, there is shown a first frying pan 10 constructed in accordance with the present invention. The frying pan 10 has a bottom wall 64 with a central portion 3 and an outer margin 60, the central portion 3 of the bottom wall 64 comprising the cooking surface. The frying pan 10 also has a peripherally continuous side wall 4 preferably integrally connected to the bottom wall 64 at the outer margin 60 of the bottom wall 64. The side wall 4 extends in a substantially upward direction from the outer margin 60. In the preferred embodiment shown in FIG. 1, an annular trough 24 circumferentially surrounds the frying pan 10 about the side wall 4. The trough 24 is generally U-shaped in cross-section and is preferably formed from a single piece of material which is separate from the material used to form the bottom wall 64 and side wall 4 of the frying pan 10, although if desired, the trough 24 may be formed integrally with the remainder of the frying pan 10. The trough 24 has an inner side wall 72 and an outer side wall 74. The trough inner side wall 72 is disposed adjacent the side wall 4 of the frying pan 10 and extends in a substantially upward direction parallel to the side wall 4. Of course, if the trough 24 is integral with the rest of the frying pan 10, trough side wall 72 and frying pan side wall 4 would themselves be integral. The trough 24 is designed to accept a side wall 44 of a second frying pan 40 when the second pan 40 is inverted and placed on the first frying pan 10 (FIG. 4).

A projection 34 extends from the trough outer side wall 74 in a substantially perpendicular direction with respect to the trough outer side wall 74. The projection 34 is generally tubular shaped and forms a pivot point 20. As shown and preferred, projection 34 is integral with wall 74 although they may be separate and joined by securing elements, adhesives, welding, or the like.

A plurality of locking holes 36 are formed in the trough outer side wall 74 circularly about the projection 34. In the preferred embodiment shown in FIG. 1, these locking holes 36 are substantially conical in shape, although other suitable geometric shapes will perform the same function, which will be described in detail below. The embodiment shown in FIG. 1 provides two locking holes 36 spaced from each other by 180° in a substantially vertical orientation. It is possible that a greater or lesser quantity of locking holes 36 may also be provided and that the relative locations be different. The locking holes 36 in the preferred embodiment are apertures for ease of manufacturing. It will be obvious to persons skilled in the art that dimples or other similar indentations will perform the same function.

An articulable handle 66 having an upper surface 8 is pivotally mounted on the projection 34 as by a pivot point 20. The articulable handle 66 is rotatable substantially about its longitudinal axis preferably in either a clockwise or counter-clockwise direction. In the preferred embodiment shown in FIG. 1, a screw 22 such as a shoulder screw is fastened to the projection 34 at the pivot point 20 for rotatably securing the articulable handle 66 to the first frying pan 10. Other rotatable fastening means such as, for example rivets and weld bead joints are also suitable for rotatably securing the articulable handle 66 to the projection 34.

The articulable handle 66 is releasably positionable in first and second handle positions. In the first handle position, shown in FIG. 1, the articulable handle 66 is tilted upwards relative to the trough outer side wall 74 with the upper surface 8 of the articulable handle 66 facing in a substantially upward direction. In the second handle position, shown in FIG. 4, the articulable handle 66 is tilted downwards relative to the trough outer side wall 74 with the upper surface 8 of the articulable handle 66 facing in a substantially downward direction. In the preferred embodiment shown in FIG. 1 and FIG. 4, the second handle position is disposed 180° from the first handle position.

A suitable detent means 11 is preferably included to releasably hold the articulable handle 66 in either of its two positions. The detent means 11 in the preferred embodiment shown in FIG. 1 includes a cylindrical channel 78 within the articulable handle 66 which extends from the end of the handle 26 confronting trough wall 74 into the interior of the articulable handle 66 in a direction substantially parallel to the upper surface 8 of the articulable handle 66. Intermediate the two ends of the channel 78 is an elongated slot 100 extending to the upper surface 8 of the articulable handle 66. Detent means 11 also includes a retractable pin 12 slidably disposed within the channel 78 preferably in the form of a metal rod. The retractable pin 12 has a locking end 38 shaped to engage the locking holes 36 in trough wall 74. Pin 12 is biased by a compression spring 14 in channel 78 to normally have the locking end 38 extend out of the channel 78 to engage the locking holes 36. Detent means 11 further comprises an actuating member 18 connected to the retractable pin 12 by a connector 19 which extends through slot 100 and is connected at one end to the actuating means 18 and at its other end to the retractable pin 12. Thus, a user may operate the actuating member 18 to manipulate the retractable pin 12 against the bias of spring 14 thereby freeing the articulable handle 66 for rotation. The detent means 11 is constructed so as to automatically return the retractable pin 12 to a first or extended position, i.e. where the locking end 38 engages the locking hole 36.

In an alternative embodiment, detent means 11 comprises a self-camming mechanism to releasably hold the articulable handle 66 in either of its two positions. In this embodiment, the articulable handle 66 is releasably positionable in its first and second position, and moveable between these positions, simply by rotating the articulable handle 66 in a clockwise or counter-clockwise direction. The self-camming detent means 11 automatically engages the articulable handle 66 and trough side wall 74 to releasably position the articulable handle 66 when the articulable handle 66 is positioned in its first and second positions.

With reference to FIG. 3, there is shown a second frying pan 40 constructed in accordance with the present invention. The frying pan 40 has a bottom wall 42 with a central portion 43 and an outer margin 45, the central portion 43 of the bottom wall 42 comprising a cooking surface. The frying pan 40 also has a side wall 44 preferably integrally connected to the bottom wall 42 at the outer margin 45 of the bottom wall 42. The side wall 44 is peripherally continuous and extends in a substantially upward direction from the outer margin 45 as viewed in FIG. 3.

A handle 46 is fixedly mounted to the second frying pan 40. The handle 46 has a bottom portion 47, with an upper surface 48, side walls 52 extending integrally from the bottom portion 47 and thereby forming a ridge 54, and a fixed handle rigid member 50 disposed within the bottom portion 47. The upper surface 48 of the handle 46 faces in a substantially upward direction. In the preferred embodiment shown in FIG. 3, the handle rigid member 50 is fixedly mounted to the side wall 44. A cross-sectional view of the handle 46 is shown in FIG. 5.

While the two frying pans 10 and 40 may be used separately, they may also be used as a unit as shown in FIG. 4. Referring to FIG. 4, the first frying pan 10 and the second frying pan 40 are shown as used in combination with the second frying pan 40 inverted and frying pan 40 are shown as used in combination with the second frying pan 40 inverted and placed on top of the first frying pan 10. In this view, the articulable handle 66 is disposed in its second handle position by detent means 11 before the second frying pan 40 is placed on top of the first frying pan 10. From this view it can be seen that the side wall 44 of the second frying pan 40 nests within the trough 24 of the first frying pan 10 with the central portion 3 of frying pan 10 in confronting relationship with the central portion 43 of frying pan 40. Alternative embodiments would provide a similar nesting relationship between the frying pan walls. By way of non-limiting example, the side wall 4 of the first frying pan 10 and the side wall 44 of the second frying pan 40 can form complimentary interlocking surfaces providing similar nesting functionality to the preferred embodiment. Furthermore, FIG. 4 also shows the close confronting parallel relationship between the articulable handle 66 and the fixed handle 46. When used in this manner a single unitary grippable handle is formed allowing the user to simultaneously turn both frying pans. FIG. 6 also shows the relationship between the articulable handle 66 and the fixed handle 46 when the first pan 10 and second pan 40 are used as shown in FIG. 4.

If desired, a detachable hinging means 108 may be incorporated to pivotally connect frying pan 40 to frying pan 10 when being used together. A preferred form of such a hinging means 108 is shown in FIG. 7 and includes a first hinge member 104 fixedly mounted to the first frying pan 10 at the exterior of the side wall 4 opposite the articulable handle 66. A second hinge member 106 is fixedly mounted to the second frying pan 40 at the exterior of the side wall 44 opposite the fixed handle 46. The first hinge member 104 interlockingly mates with the second hinge member 106 to form a hinge joint between the first frying pan 10 and second frying pan 40. It will be apparent to those skilled in the art that a variety of other hinging means will provide the same functionality.

In operation and again referring to FIG. 1, the first frying pan 10 is placed on a stove or other similar cooking device. The articulable handle 66 is temporarily fixed in the first or upwardly extending handle position. When the food being prepared is ready to be flipped over to cook its other side, the user disengages the retractable pin 12 by grasping the articulable handle 66 and sliding the actuating member 18 away from the side wall 64 of the frying pan 10 in the direction designated X. Upon disengagement of the retractable pin 12, the articulable handle 66 may be rotated in either the clockwise or counter-clockwise direction from the first handle position to the second or downwardly extending handle position. By releasing the actuating member 18 the user may releasably fix the articulable handle 66 in the second handle position (FIG. 4). Referring to FIG. 4, the user inverts the second frying pan 40 and places it on top of the first frying pan 10 such that the side wall 44 of the second frying pan 40 nests in the trough 24 of the first frying pan 10. With the pans 10 and 40 placed together as shown in FIG. 4, the articulable handle 66 rests within the ridge 54 of the fixed handle 46 in a close confronting parallel relationship thereby forming a single grippable handle suitable for flipping the frying pan combination over such that the second or initially upper frying pan 40 comes to rest on the bottom and the first or initially lower frying pan 10 on top. When the food is cooked, the first frying pan 10 is removed from on top of the second frying pan 40. Once the first frying pan 10 is removed, the cooked food may be removed from second frying pan 40. The articulable handle 66 may then be returned to the first handle position for further use.

Thus, while there have been shown and described and pointed out a variety of features of the invention as applied to preferred embodiments thereof, it will be understood that various omissions and substitutions and changes in the form and details of the devices illustrated, and in their operation, may be made by those skilled in the art without departing from the spirit or scope of the invention as defined in the appended claims.

What is claimed is:

1. A cooking apparatus comprising:
   a first pan including a bottom wall with a central portion and an outer margin, a side wall extending upwardly from said outer margin of said bottom wall, an articulable longitudinally extending handle, said handle having an upper surface, said handle being pivotally mounted on said pan for movement substantially about its longitudinal axis between a first handle position in which said handle is tilted upwards relative to said side wall when said first pan is oriented with its bottom wall at the bottom of said first pan and a second handle position in which said handle is out of said first handle position;
   a second pan having a bottom wall with a central portion and an outer margin, a side wall extending upwardly from said outer margin of said bottom wall, said pan having a handle mounted on said side wall, said handle having an upper surface and being tilted upwards relative to said side wall when said second pan is oriented with said bottom wall at the bottom of said second pan; and
   means for registering said first and second pans together when said second pan is inverted and placed on top of said first pan.

2. The cooking apparatus as defined in claim 1, wherein said handle of said first pan is tilted downwardly when said first pan is oriented with its bottom wall at the bottom of the pan and said handle is in said second position.

3. The cooking apparatus as defined in claim 1, wherein when said pans are registered and said handle of said first pan is in said second position, said two handles are substantially parallel and extend in close confronting relation.

4. The cooking apparatus as defined in claim 3, said handle of said second pan having a longitudinally extending groove in its upper surface, said handle of said first pan being disposed at least in part in said longitudinal groove in said second handle when said first and second pans are inverted relative to one another and are registered.

5. The cooking apparatus as defined in claim 1, further comprising hinge means for pivotally connecting said first and second pans to one another.

6. The cooking apparatus as defined in claim 5, wherein said hinge means comprises:
   a first hinging member mounted on said side wall of said first pan; and
   a second hinging member mounted on said side wall of said second pan, said second hinging member being detachably hingeably interlockable with said first hinging member.

7. The cooking apparatus as defined in claim 1, wherein said means for registering said first and second pans comprises a trough circumferentially disposed about said side wall of said first pan, said trough being substantially U-shaped in cross-section, said trough being sized to receive said side wall of said second pan when said second pan is invertedly placed above and in registration with said first pan.

8. The cooking apparatus as defined in claim 7, wherein said handle of said first pan is tilted downwardly when said handle is in said second position, and when said pans are registered and said handle of said first pan is in said second position, said handle of said first pan and said handle of said second pan are substantially parallel and extend in close confronting relation to one another.

9. The cooking apparatus as defined in claim 8, said handle of said second pan having a longitudinally extending groove in its upper surface, said handle of said first pan being disposed at least in part in said longitudinal groove in said second handle when said first and second pans are inverted relative to one another and are registered.

10. The cooking apparatus as defined in claim 9, further comprising hinge means for pivotally connecting said first and second pans to one another, wherein said hinge means comprises:
   a first hinging member mounted on said side wall of said first pan; and
   a second hinging member mounted on said side wall of said second pan, said second hinging member being detachably hingeably interlockable with said first hinging member.

11. A cooking apparatus comprising:
   a pan including a bottom wall with a central portion and an outer margin, and a side wall extending upwardly from said outer margin of said bottom wall;
   an articulable longitudinally extending handle, said handle having an upper surface, said handle being pivotally mounted at a mounting point on said pan for movement substantially between a first handle position in which said handle is tilted upwards relative to said side wall when said pan is oriented with its bottom wall at the bottom of said pan and a second handle position in which said handle is out of said first handle position;
   means for releasably holding said handle in said first and second handle positions;
   a second pan having a bottom wall with a central portion and an outer margin, a side wall extending upwardly from said outer margin of said bottom wall, said second pan having a handle mounted on said side wall, said handle having an upper surface and being tilted upwards relative to said side wall when said second pan is oriented with said bottom wall at the bottom of said second pan; and
   means formed on said side wall of said pan for registering said pan with said second pan, said registering means being configured for supportedly receiving and mating with said second pan in an inverted, close confronting orientation atop said pan for registration therewith, the handle of said second pan being in substantial coextensive parallel alignment with said handle of said pan when said handle of said pan is in said second position so as to effectively simulate a unitary handle made from the handles of said pan and said second pan, enabling a user to grasp both handles simultaneously.

12. The cooking apparatus as defined in claim 11 wherein said means for releasably holding said handle of said pan in said first and second handle positions is at least in part mounted on said handle of said pan.

13. The cooking apparatus as defined in claim 12, wherein said means for holding said handle of said pan in said first and second handle positions is a detent means.

14. The cooking apparatus as defined in claim 13, wherein said detent means includes a retractable pin mounted on said handle of said pan for longitudinal movement between a holding position for releasably holding said handle of said pan selectively in said first handle position and said second handle position, and another position for permitting said handle of said pan to be moved between said first and second handle positions.

15. The cooking apparatus as defined in claim 14, wherein said detent means further comprises means for biasing said pin toward said holding position.

16. The cooking apparatus as defined in claim 15, wherein said means for biasing said pin comprises a compression spring.

17. The cooking apparatus as defined in claims 15, further comprising means for moving said pin between said holding and said another position, including a member connected at one end to and extending from said pin and at the other end to a manually graspable actuating member moveable relative to said handle of said pan.

18. The cooking apparatus as defined in claim 11, wherein said second handle position is about 180° away from said first handle position.

19. The cooking apparatus as defined in claim 11, further comprising hinge means for pivotally connecting said pan and said second pan to one another.

20. The cooking apparatus as defined in claim 19, wherein said hinge means comprises:
   a first hinging member mounted on said side wall of said pan; and
   a second hinging member mounted on said side wall of said second pan, said second hinging member being detachably hingeably interlockable with said first hinging member.

21. The cooking apparatus as defined in claim 11, wherein said means for registering said pan and said second pan comprises a trough circumferentially disposed about said side wall of said pan, said trough being substantially U-shaped in cross-section.

22. The cooking apparatus as defined in claim 11, said handle of said second pan having a longitudinally extending groove in its upper surface, and said handle of said pan being disposed at least in part in said longitudinal groove when said second pan is invertedly placed atop and in registration with said pan.

23. The cooking apparatus as defined in claim 11, wherein said handle of said pan is tilted downwardly when said pan is oriented with its bottom wall at the bottom of the pan and said handle of said pan is in said second position.

24. The cooking apparatus as defined in claim 23, said handle of said second pan having a longitudinally extending groove in its upper surface, and said handle of said pan being disposed at least in part in said longitudinal groove when said second pan is invertedly placed above and in registration with said pan.

* * * * *